(12) United States Patent
Majeti

(10) Patent No.: US 7,380,461 B2
(45) Date of Patent: Jun. 3, 2008

(54) MICRO-ELECTROMECHANICAL CAPACITIVE STRAIN SENSOR

(76) Inventor: Suryakala Majeti, 1930 Haverhill Dr., Rochester Hills, MI (US) 48306

( * ) Notice: Subject to any disclaimer, the term of this patent is extended or adjusted under 35 U.S.C. 154(b) by 0 days.

(21) Appl. No.: 11/684,592

(22) Filed: Mar. 9, 2007

(65) Prior Publication Data
US 2008/0034883 A1 Feb. 14, 2008

Related U.S. Application Data

(60) Provisional application No. 60/893,884, filed on Mar. 8, 2007, provisional application No. 60/780,703, filed on Mar. 9, 2006.

(51) Int. Cl.
*G01L 1/14* (2006.01)

(52) U.S. Cl. ............................ 73/780; 73/777; 257/417

(58) Field of Classification Search ............. 73/504.12, 73/504.14–504.16, 777, 780; 257/417
See application file for complete search history.

(56) References Cited

U.S. PATENT DOCUMENTS

| 5,750,904 | A | 5/1998 | Doemens et al. |
| 5,786,621 | A | 7/1998 | Saif et al. |
| 6,292,108 | B1 | 9/2001 | Straser et al. |
| 6,529,127 | B2 | 3/2003 | Townsend et al. |
| 6,606,913 | B1 | 8/2003 | Gianchandani |
| 6,950,767 | B2 | 9/2005 | Yamashita |
| 7,073,405 | B2 | 7/2006 | Rioux |
| 7,093,498 | B2 | 8/2006 | Herbert et al. |
| 7,167,009 | B2 | 1/2007 | Van Schoor et al. |
| 2003/0174580 | A1 | 9/2003 | Rioux |
| 2006/0070451 | A1 | 4/2006 | Walsh et al. |
| 2006/0080048 | A1 | 4/2006 | Kessler |
| 2006/0107768 | A1 | 5/2006 | Johnson et al. |
| 2007/0018083 | A1 | 1/2007 | Kumar et al. |

OTHER PUBLICATIONS

Y. B. Gianchandani and K. Najafi, "Bent-Beam Strain Sensors," Journal of Microelectromechanical Systems, vol. 5, No. 1, Mar. 1996, pp. 52-58.*
J. Guo, H. Kuo, D.J. Young, W.H. Ko, "Buckled Beam Linear Output Capacitive Strain Sensor," Solid-State Sensor. Actuator and Microsystems Workshop, Hilton Head Island USA (Jun. 6-10, 2004), pp. 344-347.*
L. L. Chu, L. Que, and Y. B. Gianchandani, "Measurements of Material Properties Using Differential Capacitive Strain Sensors," Journal of Microelectromechanical Systems, vol. 11, No. 5, Oct. 2002, pp. 489-498.*

* cited by examiner

*Primary Examiner*—Edward Lefkowitz
*Assistant Examiner*—Punam Patel
(74) *Attorney, Agent, or Firm*—Christopher Wood; Wood & Eisenberg, PLLC

(57) ABSTRACT

A micro-electromechanical capacitive strain sensor. The micro-electromechanical capacitive strain sensor comprises a first bent beam, a second bent beam, and a straight center beam. The first bent beam, second bent beam, and straight center beam are aligned in the X-axis with the straight center beam located between the first and second bent beams. The first bent beam, second bent beam, and straight center beam are disposed between two anchors. The two anchors are aligned in the Y-axis. The first bent beam is bent away from the center beam and the second bent beam is bent towards the center beam to provide a set of differential capacitors with respect to the center beam, wherein the center beam serves as a common reference with respect to the first and second bent beams.

3 Claims, 21 Drawing Sheets

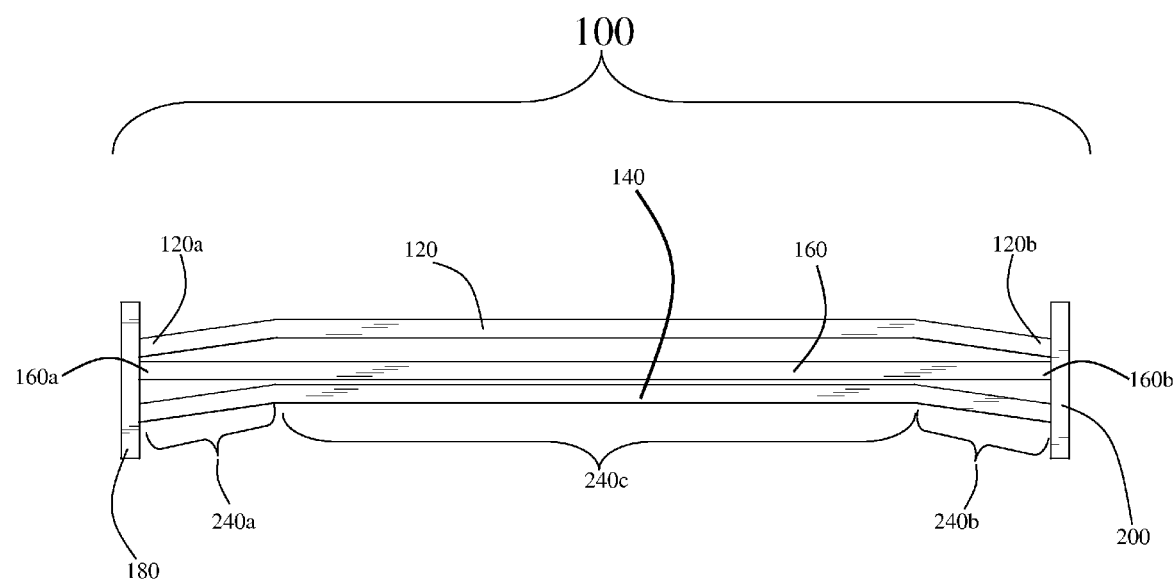
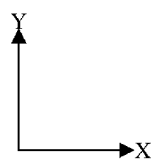
FIG. 4

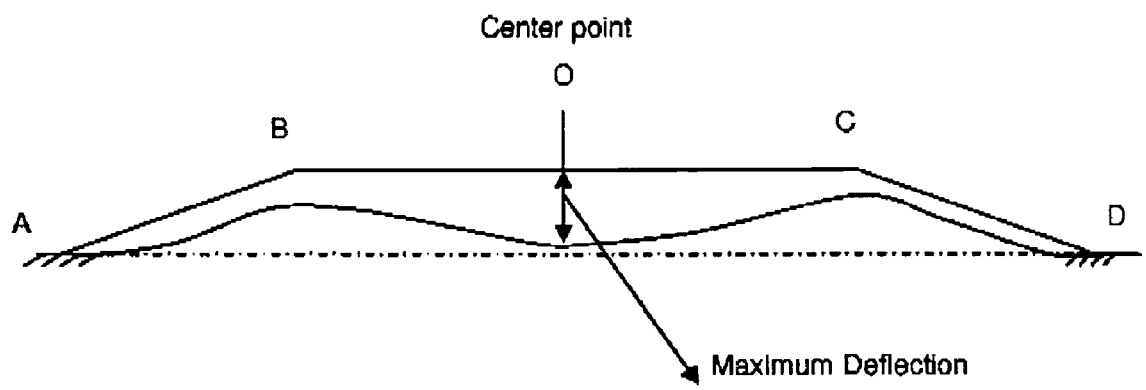
Figure 4.6. Maximum deflection at center of beam.

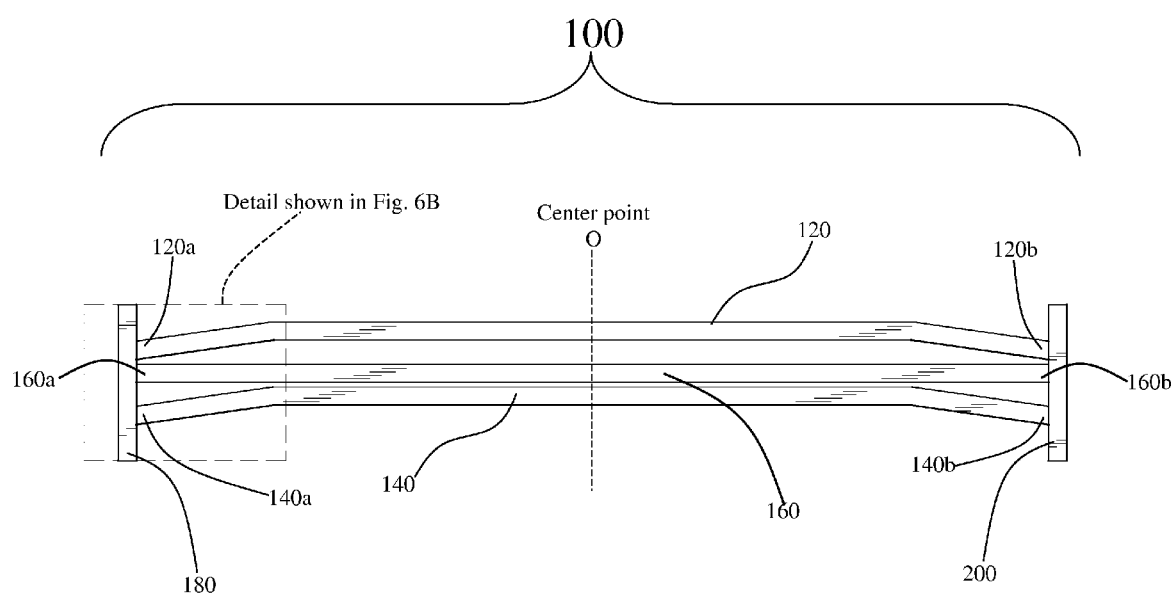
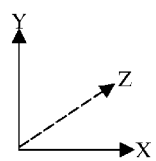
FIG. 6A

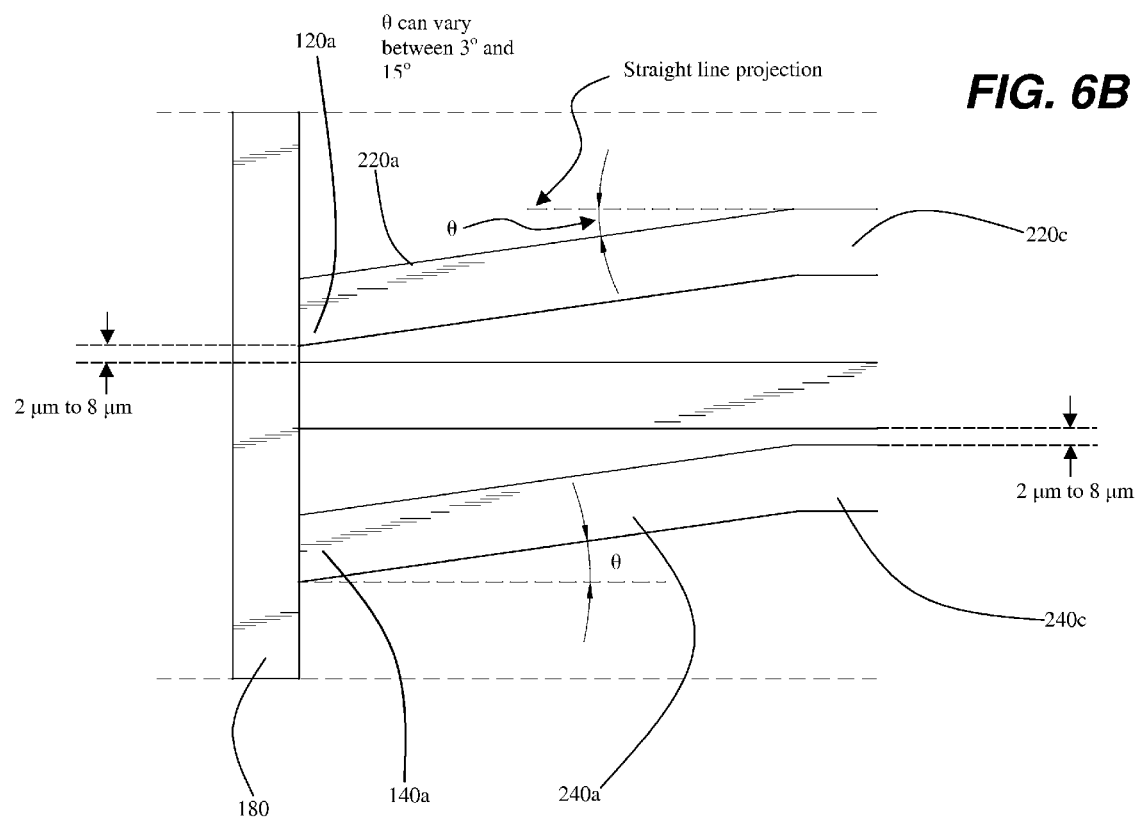

| Contact Photolithography (Automated) | Side | |
|---|---|---|
| | Front | |

| Alignment Tolerance | 100 μm | Alignment Type | flat | Batch size | 1 |
|---|---|---|---|---|---|
| Magnification | 1 | Min Feature Size | 4 μm | Perform ER | no |
| Perform Hardbake | none | Perform Line Width Metrology | no | Perform Microscope Inspection | yes |
| Perform Stylus Profilometry | no | Resist Thickness | 2.1 μm | | |
| Wafers | Category | Processed | | | |
| | 100 mm | 3 of 3 | | | |

| 1. HMDS Vapor Prime | | | | both |
|---|---|---|---|---|
| Material | HMDS | Thickness | 100 Å | |
| 2. Photoresist Spin Coat ACS200 (AZ 5214E) | | | | front |
| Material | | AZ 5214 E | | |
| 3. Photoresist Softbake ACS 200 | | | | both |
| 4. Contact flat alignment and exposure | | | | both |
| Wafer category | 100 mm | Alignment type | Align to flat | Mask | A_Mask |
| 5. Photoresist Develop (5214 E) | | | | both |
| Depth | 1.4 ..3 μm | Material | AZ 5214 E | |
| 6. Microscope Inspection | | | | both |
| Processing instructions | | Mask: Beams | | |

Figure 12 - Process Step 1: photolithography.

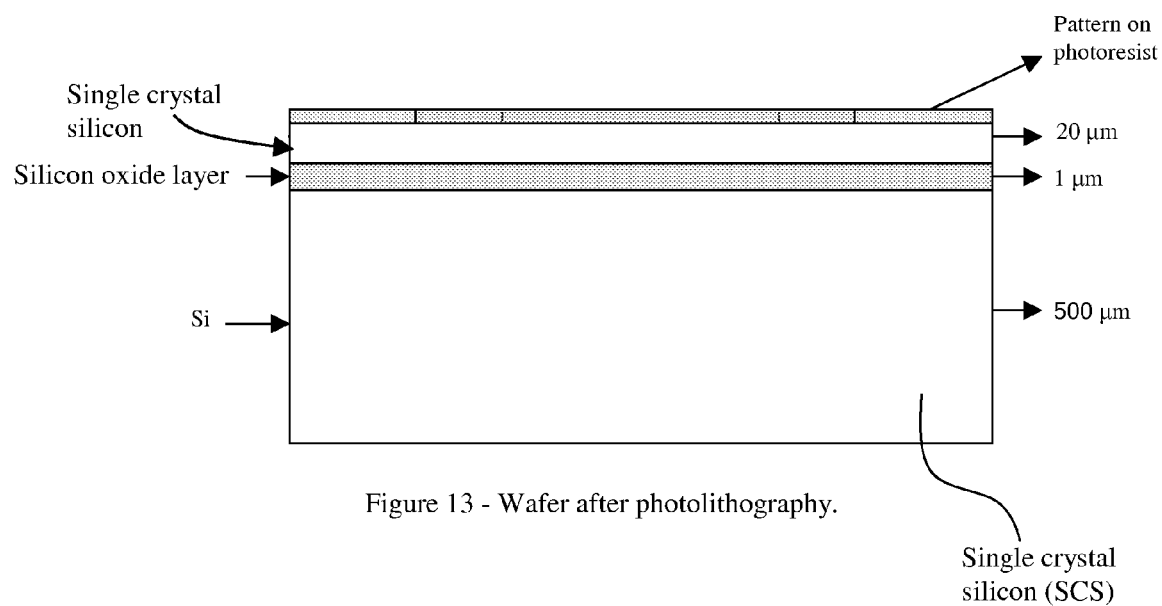
Figure 13 - Wafer after photolithography.

| Silicon DRIE Photolithography (Unaxis VLR 700) | | | Side | | |
|---|---|---|---|---|---|
| | | | Front | | |
| Alignment Tolerance | 2 μm | Alignment Type | Front - front | Aspect ratio | 15 |
| Depth | 20 μm | Etch Rate | 4 μm/min | Etchant | Bosch process |
| Mask Materials | AZ 8245, AZ 5214e | Material | silicon | Min Feature Size | 4 μm |
| Perform Edge Bead Removal | no | Perform Handle Wafer Mounting | no | Perform Microscopic Inspection | yes |
| Perform sem Sample Analysis | no | Perform Stylus Profilometry | yes | Resist Thickness | 2.1 μm |
| Selectivity | Photoresist (category): 75, silicon dioxide: 150, silicon :1 | | | | |
| Wafers | Category | Processed | Etch through device layer down to base oxide. | | |
| | Group1 | 3 of 3 | | | |

Figure 14 - Process Step 2: dry etch.

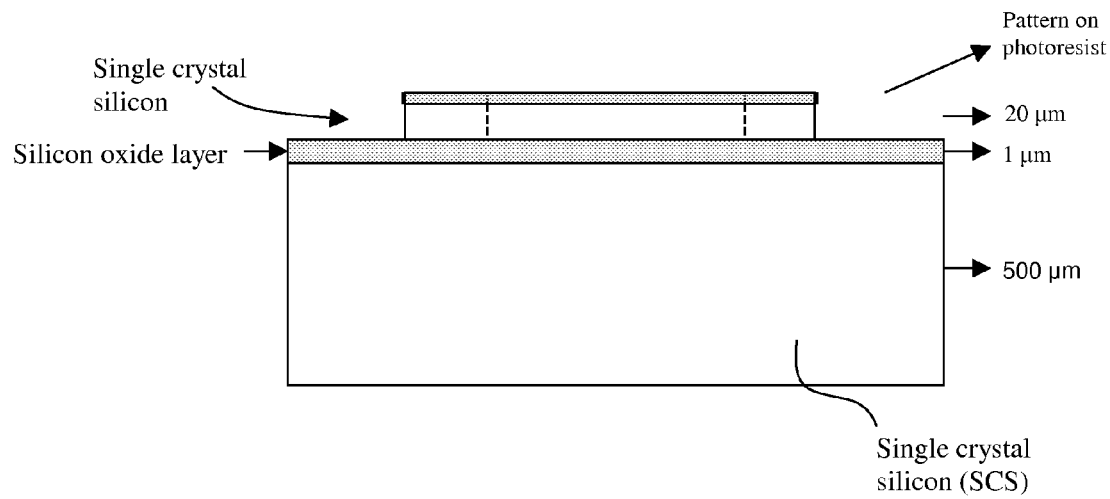
Figure 15 - Wafer after being etched.
| Photoresist Stripping (Metroline) | Side |
|---|---|
| | Both |
| Depth | 0.1 .. 10 μm | Etch type | Dry isotropic | Material | Photoresist (category) |
|---|---|---|---|---|---|
| Wafers | Category | Processed | | | |
| | Group 1 | 3 of 3 | | | |
Figure 16 - Process Step 3: photoresist strip.

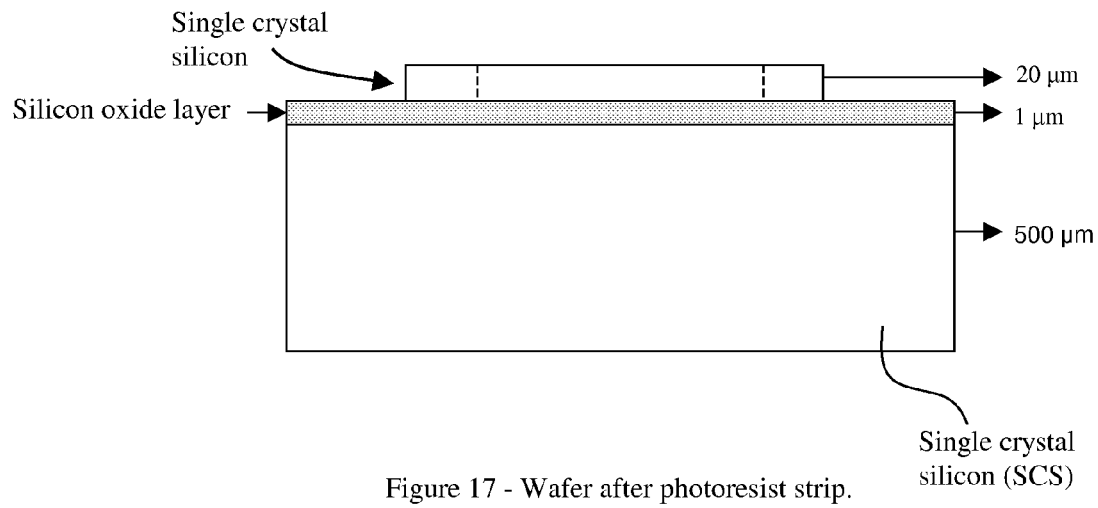
Figure 17 - Wafer after photoresist strip.
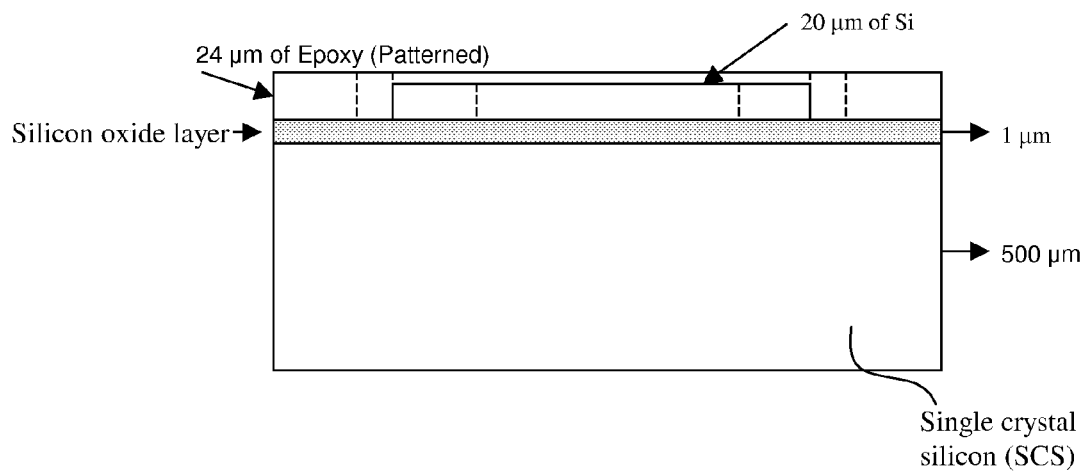
Figure 18 - Wafer with UV-curable epoxy coating.

| Epoxy Stripping | Side |
|---|---|
| | Both |
| Depth | 0.1 .. 10 μm | Etch type | Dry isotropic | Material | Photoresist (category) |
|---|---|---|---|---|---|
| Wafer | Category | Processed | | | |
| | Group 1 | 3 of 3 | | | |
Figure 19 - Process Step 5: epoxy strip.
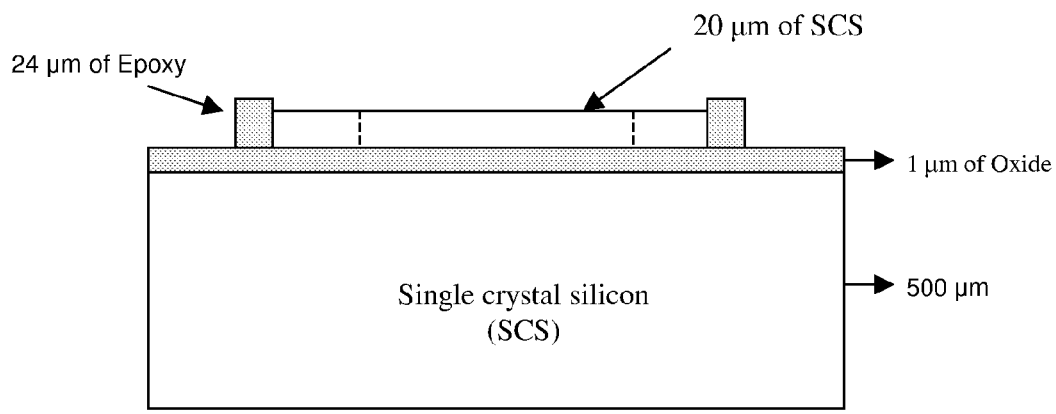
Figure 20 - Wafer after epoxy strip.

| HF Dip | Side |
|---|---|
| | Both |
| Batch sizes | 100 mm: 25, 150 mm: 1 | Depth | 1.. 30 μm | Etch type | Wet isotropic |
|---|---|---|---|---|---|
| Etchant | HF/Water [1:10] | Material | Silicon dioxide | Temperature | 25°C |
| Wafers | Category | Processed | | | |
| Processing Instructions | Device lift-off from handle |
|---|---|
Figure 21 - Process Step 6: HF dip.
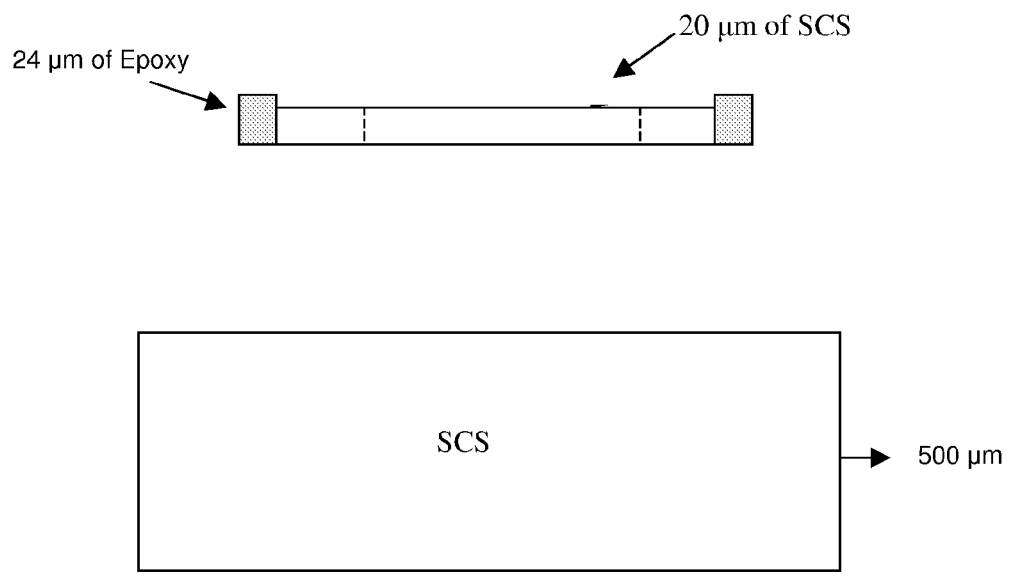
Figure 22 - Wafer after HF dip.

MICRO-ELECTROMECHANICAL CAPACITIVE STRAIN SENSOR

CROSS-REFERENCE TO RELATED APPLICATIONS

This application claims the benefit of priority from U.S. Provisional Patent Application Ser. Nos. 60/780,703 (filed Mar. 9, 2006) and 60/893,884 (filed Mar. 8, 2007). The contents of Provisional Patent Application Ser. Nos. 60/780, 703 and 60/893,884 are incorporated herein by reference in their entirety.

STATEMENT REGARDING FEDERALLY SPONSORED RESEARCH OR DEVELOPMENT

Not Applicable.

FIELD OF THE INVENTION

The present invention relates to a capacitive strain sensor. More specifically, the invention is a micro-electromechanical capacitive strain sensor ("MECASS").

BACKGROUND OF THE INVENTION

Sensors play an important role in a wide variety of devices as sensors can provide critical information concerning the status, operational conditions, performance, wear, safety, and countless other conditions. Strain sensors provide information about a load and serve an important role in monitoring the structural health of structures such as civil engineering structures.

As noted in U.S. Publication Number 20060070451, monitoring load distributions provide information about the forces within a mechanical structure, including bending and twisting, that can be communicated to a monitoring device and provide warnings or historical performance information concerning the safety of a mechanical component.

A strain sensor may be incorporated into an electronic control system that limits some form of operation or applies a corrective load when dangerous conditions are detected by a strain sensor. Limitations of conventional strain sensors include the power consumption needs of the strain sensors, the manner in which the strain sensors may be connected into other systems, the sensitivity and operating range of the sensor, and the size of the strain sensors. Thus, there is a need for a strain sensor that can operate at a higher range of sensitivity, with lower power consumption, in harsh environments, with off-the-shelf electronics, and on a microscale.

U.S. Pat. No. 5,786,621, issued Jul. 28, 1998 to Saif et al., describes a micro-scale electromechanical structure incorporating a stable planar frame, to which is connected a multiplicity of comb-type capacitive actuators. The frame is mounted to a substrate by means of arms which position the capacitor plates, and the instrument is calibrated by buckling a beam cofabricated with the instrument, and is used for material structural health monitoring testing, in macroscopic analytical devices, in order to study in-situ the microstructural changes.

Micro-scale electromechanical structure strain sensors that rely on traditional comb-type structure typically function well under controlled conditions, but less well in harsh environments and may have limited sensitivity and operating range. Thus, there is a need for a micro-scale electromechanical structure strain sensor that can operate at a higher range of sensitivity in harsh environments.

SUMMARY OF THE INVENTION

A micro-electromechanical capacitive strain sensor. The micro-electromechanical capacitive strain sensor comprises a first bent beam, a second bent beam, and a straight center beam. The first bent beam, second bent beam, and the straight center beam are aligned in the X-axis with the straight center beam located between the first and second bent beams. The first bent beam, second bent beam, and straight center beam are disposed between two anchors. The two anchors are aligned in the Y-axis. The first bent beam is manufactured to be bent away from the center beam and the second bent beam is manufactured to be bent towards the center beam to provide a set of differential capacitors with respect to the center beam, wherein the center beam serves as a common reference with respect to the first and second bent beams. When the first and second opposite ends of the first, second and center beams are displaced in opposite directions in the X-axis the first bent beam is deflected in the Y-axis direction towards the center beam thereby increasing capacitance and the second bent beam is deflected in the Y-axis direction away from the center beam thereby decreasing capacitance.

BRIEF DESCRIPTION OF THE DRAWINGS

FIGS. 3-4 are top views of the micro-electromechanical capacitive strain sensor of FIG. 1.

FIG. 4.6 shows maximum deflection at center of beam.

FIG. 6A shows a top planar view of a micro-electromechanical capacitive strain sensor according to the present invention.

FIG. 6B shows a detailed view of part of the micro-electromechanical capacitive strain sensor of FIG. 6A.

FIGS. 12-22 show a non-limiting working example of the steps in fabricating a micro-electromechanical capacitive strain sensor according to the present invention.

Similar reference characters denote corresponding features consistently throughout the attached drawings.

DETAILED DESCRIPTION OF THE INVENTION

Figure 1:
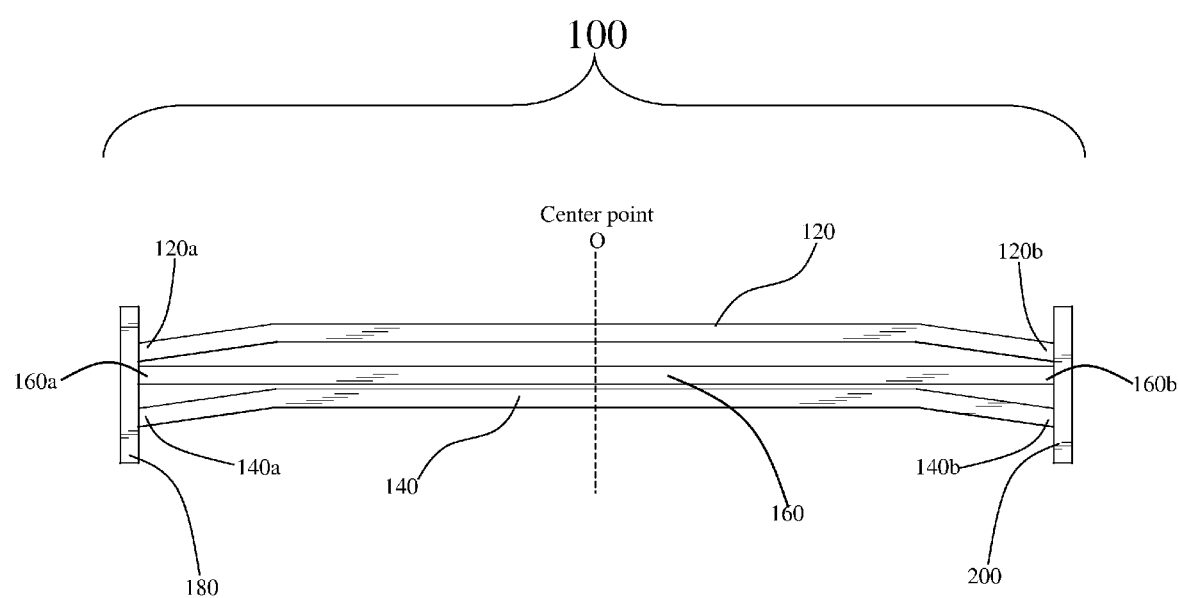
FIG. 1 shows a top planar view of a micro-electromechanical capacitive strain sensor according to the present invention.
Figure 2:
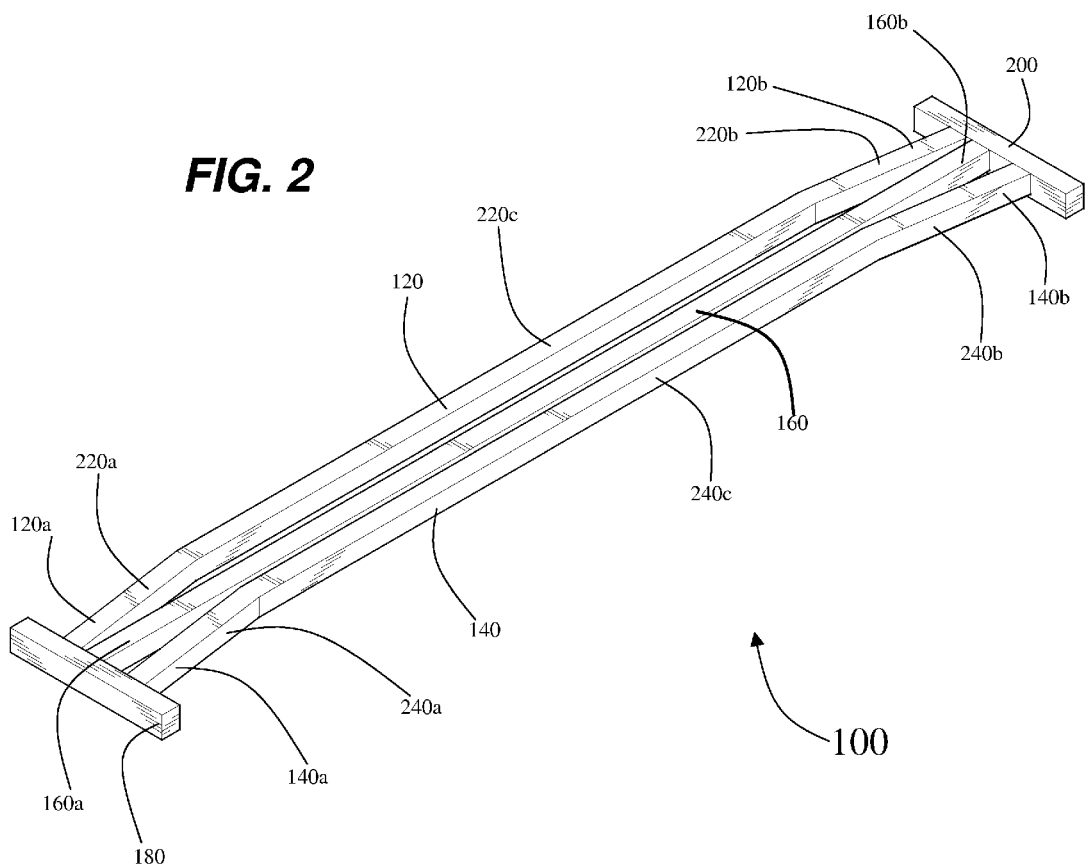
FIG. 2 is a perspective view of the micro-electromechanical capacitive strain sensor of FIG. 1.
Figure 3:
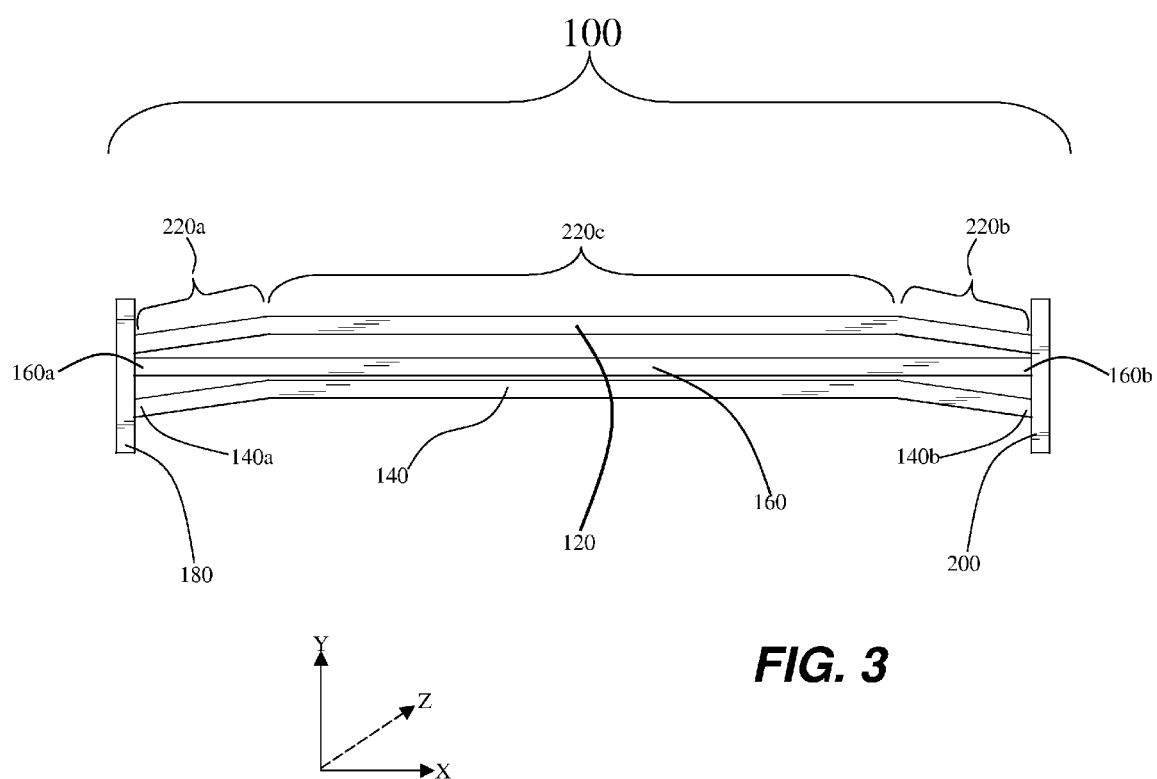
Figure 5A:
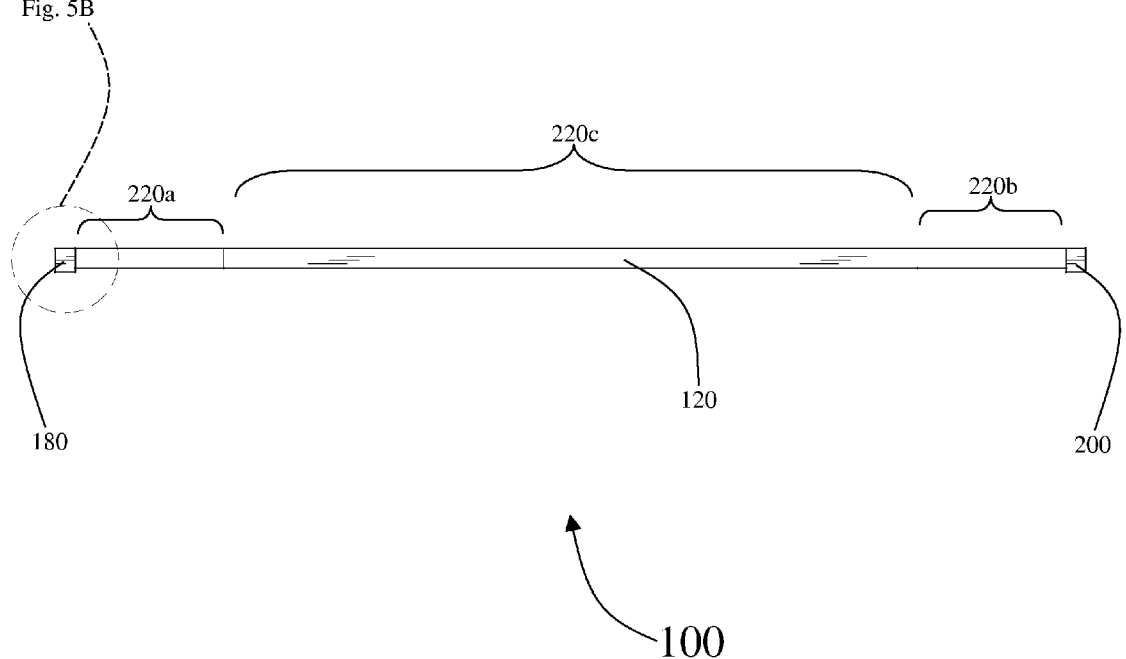
FIG. 5A is a side view of the micro-electromechanical capacitive strain sensor of FIG. 1.
Figure 5B:
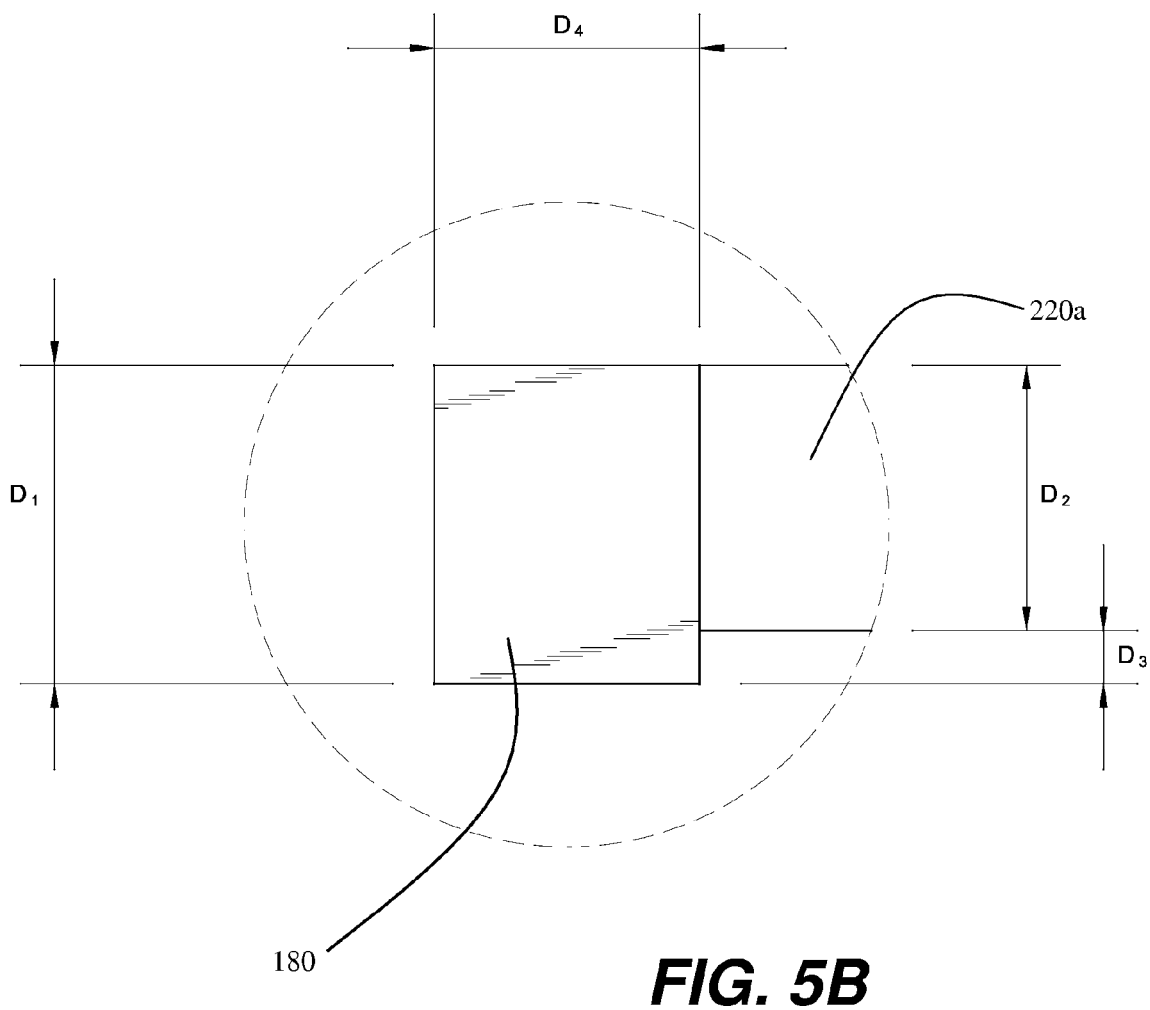
FIG. 5B shows a detailed view of part of the micro-electromechanical capacitive strain sensor of FIG. 5A.

The present invention is directed to a capacitive strain sensor. More specifically, the invention is a micro-electromechanical capacitive strain sensor ("MECASS"). The micro-electromechanical capacitive strain sensor of the present invention is denoted generally by the numeric label "100".

The micro-electromechanical capacitive strain sensor 100 of the present invention is suitable for, among other things, monitoring strain in cables.

Referring to FIGS. 1 through 8, the micro-electromechanical capacitive strain sensor 100 comprises a first bent beam 120, a second bent beam 140, and a central straight horizontal beam 160. It should be understood that the terms "the straight center beam 160" and "center beam 160" are regarded as equivalent terms. The beams 120, 140 and 160 are made of any suitable material such as silicon. If beams 120, 140 and 160 are made of silicon, the type of silicon can vary; for example, single crystal silicone (SCS).

The beams 120, 140 and 160 can have a uniform cross-section with a width in the x-plane of between 15 μm and 30 μm, and a depth in the z-plane of between 15 μm and 30 μm.

Still referring to FIGS. 1 through 8, the first 120, second 140 and central 160 beams each define first and second opposite ends. More specifically, first bent beam 120 defines opposite ends 120a and 120b; second bent beam 140 defines opposite ends 140a and 140b; and the center beam 160 defines opposite ends 160a and 160b. The straight center beam 160 is located between the first 120 and second 140 bent beams. The beams 120, 140 and 160 are aligned, without touching, in the X-axis.

The first bent beam 120 is bent away from the center beam 160 and the second bent beam 140 is bent towards the center beam 160 to provide a set of differential capacitors with respect to the center beam 160. The center beam 160 serves as a common reference with respect to the first 120 and second 140 beams such that when the first and second opposite ends of the first, second and center beams are displaced in opposite directions in the X-axis the first bent beam 120 is deflected in the Y-axis direction towards the center beam 160 and the second bent beam 140 is deflected in the Y-axis direction away from the center beam 160 (see, e.g., FIG. 4.6 in Provisional Patent Application Ser. No. 60/893,884 (filed Mar. 8, 2007) to which the present patent application claims the benefit of priority).

More specifically, when ends 120a and 120b of first bent beam 120 and ends 160a and 160b are displaced in opposite directions away from a center point "O", the beam 120 is deflected towards the center beam 160, wherein the center beam merely elongates (i.e., stretches) in the X-axis. So the first bent beam 120 is rendered closer to the straight center beam 160 thereby increasing the capacitance between the first bent beam 120 and the straight center beam 160. In contrast, when ends 140a and 140b of second bent beam 140 and ends 160a and 160b are displaced in opposite directions away from a center point "O", the beam 140 is deflected away from the center beam 160, wherein the center beam merely elongates (i.e., stretches) in the X-axis. So the second bent beam is rendered further away from the straight center beam 160 thereby decreasing the capacitance between the second bent beam 140 and the straight center beam 160.

Figure 10:
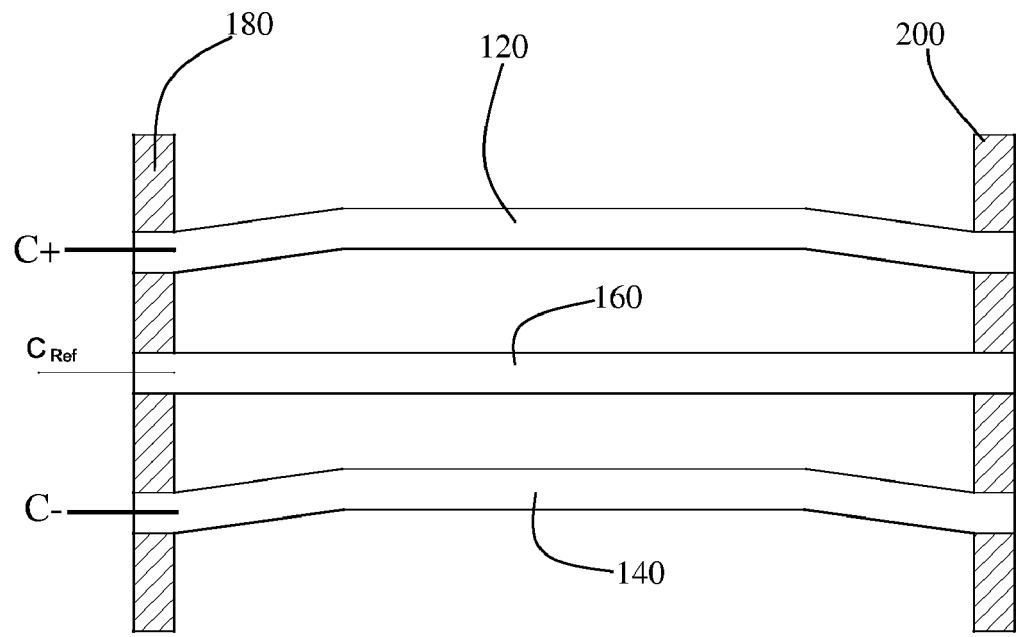
FIG. 10 shows a top schematic view of a micro-electromechanical capacitive strain sensor according to the present invention.
Figure 11:
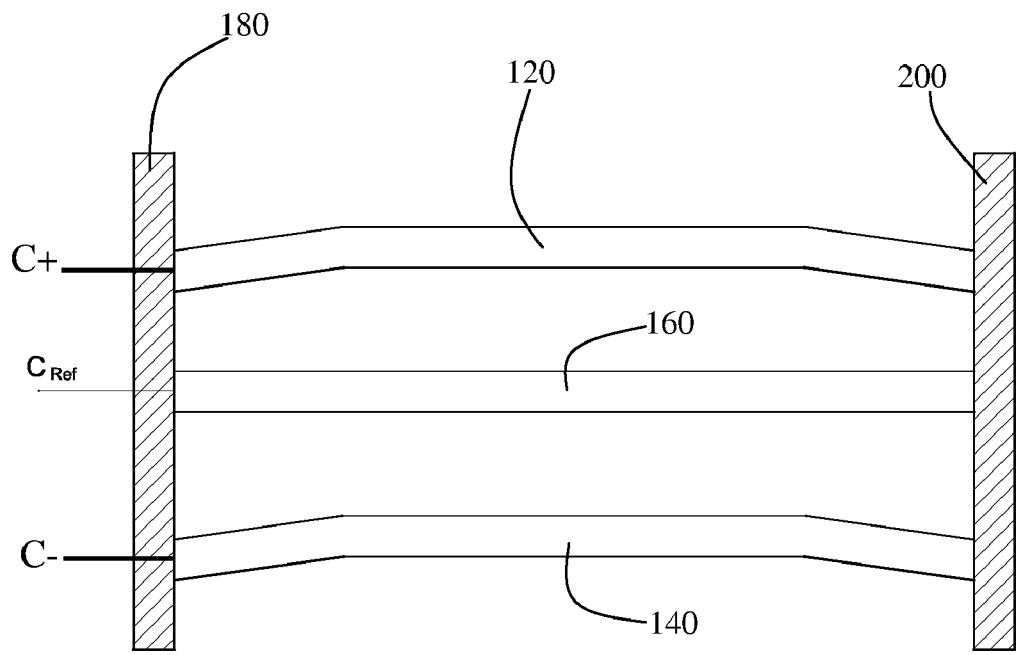
FIG. 11 shows a top schematic view of a micro-electromechanical capacitive strain sensor according to the present invention.

Still referring to FIGS. 1 through 8, the micro-electromechanical capacitive strain sensor 100 further comprises a first longitudinal anchor 180 and a second longitudinal anchor 200. The first and second anchors 180 and 200 are positioned in the Y-axis relative to the straight center beam 160. The first anchor 180 is connected to the first opposite ends of the first, second and center beams, and the second anchor is connected to the second ends of the first, second and center beams. More specifically, the first anchor 180 is connected to the first opposite ends 120a, 140a and 160a of the first bent beam 120, second bent beam 140 and the straight center beam 160, respectively; and the second anchor 200 is connected to the second opposite ends 120b, 140b and 160b of the first bent beam 120, second bent beam 140 and the straight center beam 160, respectively. The first and second anchors 180 and 200 are made of insulating material to electrically isolate the first, second and center beams 120, 140 and 160, respectively, from each other. The construction and layout of the anchors 180 and 200 can vary. For example, compare the anchors 180 and 200 in FIGS. 10 and 11.

The tags C+, $C_{ref}$ (or $C_{com}$) and C− can be arbitrarily applied to the beams 120, 160 and 140, respectively. The "C+" designation refers to the increase in capacitance between the first bent beam 120 and straight center beam 160, which occurs when the first bent beam 120 deflects towards the straight center beam 160. The "C−" designation refers to the decrease in capacitance between the second bent beam 140 and center beam 160, which occurs when the second bent beam 140 deflects away from the center beam 160. The $C_{ref}$ tag merely reflects that the straight beam 160 elongates (stretches) in the X-axis direction when its ends 160a and 160b are displaced in opposite directions in the X-axis.

Still referring to FIGS. 1 through 8, the first and second bent beams 120 and 140 can each be categorized as comprising first and second opposite end rafter segments and a middle collar segment, the rafter and collar segments being continuous. More specifically, first bent beam 120 can be categorized as comprising first and second opposite end rafter segments 220a and 220b and a straight middle collar segment 220c (see. e.g., FIG. 3); and second bent beam 140 can be categorized as comprising first and second opposite end rafter segments 240a and 240b and a straight middle collar segment 240c (see, e.g., FIG. 4).

When the micro-electromechanical capacitive strain sensor 100 is not under stress, the middle collar segments 220c and 240c can be characterized as central straight segments with slanted rafter segments on either side. The degree of slant is the angle (represented here by the Greek letter "θ") between a straight-line projection from the central straight segment and either one of the adjoining ratter segments (e.g., with respect to middle collar segment 220c this would be rafter segments 220a and 220b) see, e.g. FIGS. 3 and 6A and 6B θ can vary between 3 degrees and 15 degrees (i.e., between 3° and 15° )

Figure 8:
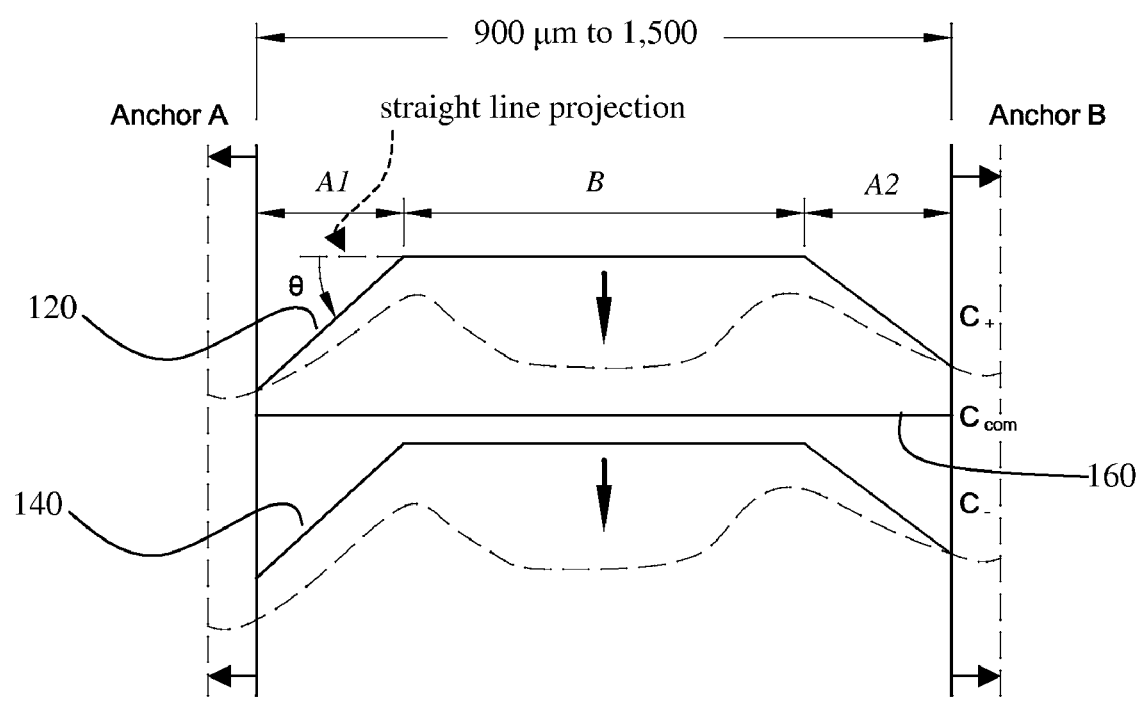
FIG. 8 shows a dynamic schematic of a micro-electromechanical capacitive strain sensor according to the present invention.

The horizontal projected lengths of rafters 220a and 240a are represented by the label "A1" in FIG. 8; the horizontal projected lengths of rafters 220b and 240b are represented by the label "A2" in FIG. 8; and the horizontal projected length of the central straight collar segments 220c and 240c are represented by the label "B" in FIG. 8; however, while the horizontal projections (under no stretching load) of segments 220c and 240c equal each other in FIG. 8, the actual horizontal projections for segments 220c and 240c may not correspond and may differ—likewise between segments 220a and 240a, and 220b and 240b. An explanation of "horizontal projected length" is also provided in the first paragraph on page 42 of the specification in U.S. Provisional Patent Application No. 60/893,884. The total horizontal projected lengths of the two rafter segments and the central straight collar segment (i.e., A1, B and A2 combined) is between 900 µm and 1,500 µm (see FIG. 8); therefore the distance between the first and second anchors 180 and 200 is between 900 µm and 1,500 µm. The horizontal projected length of any of the rafter segments is between 100 and 400 µm. The horizontal projected length of either central straight collar segments is between 100 µm and 1,300 µm. Whatever the individual horizontal projected lengths represented by A1, B and A2, the total value (i.e., A1, B and A2 combined), and as already stated, is between 900 µm and 1,500 µm.

Figure 9:
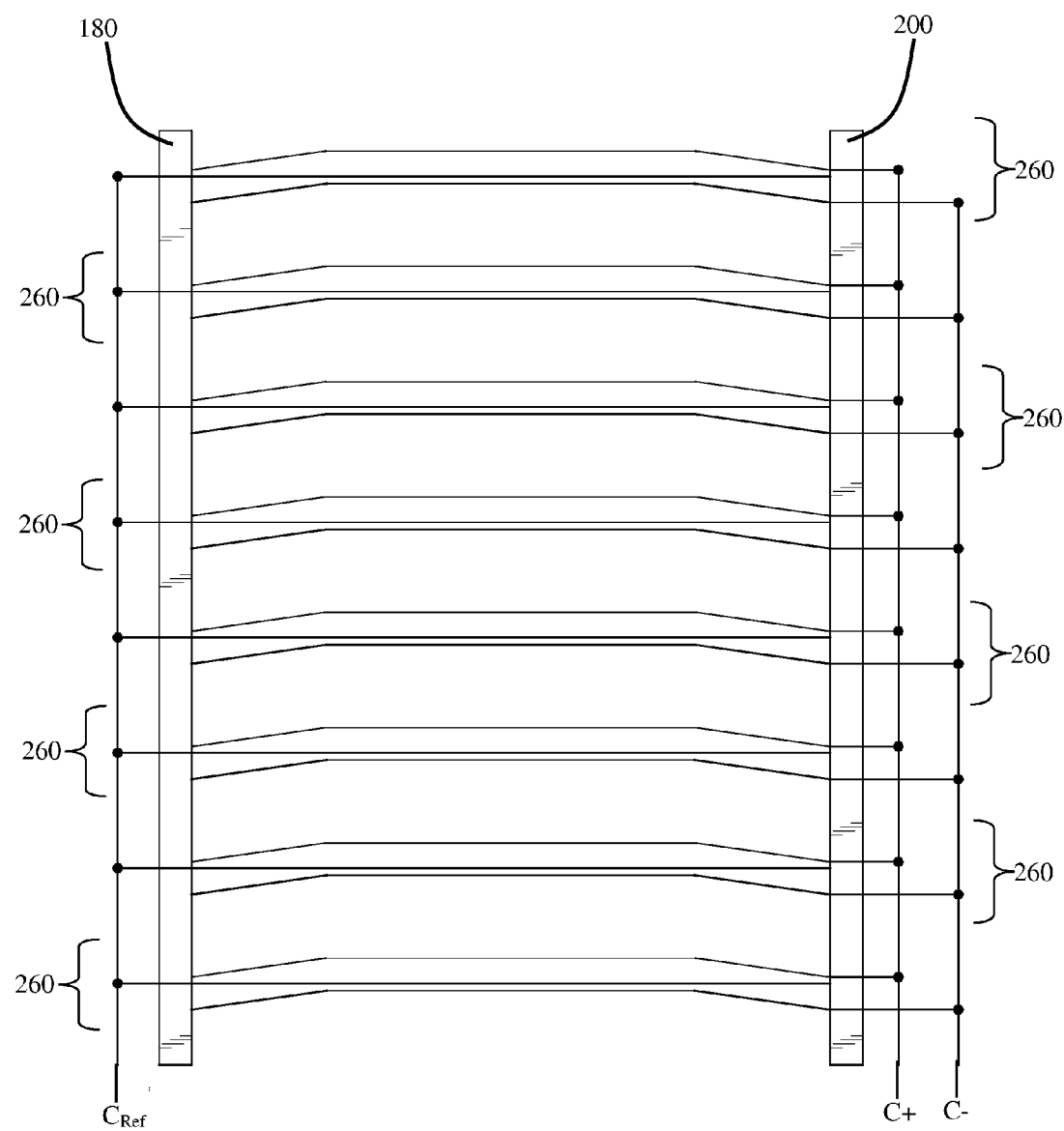
FIG. 9 shows a schematic of a parallel version of the micro-electromechanical capacitive strain sensor according to the present invention.
Figure 9A:
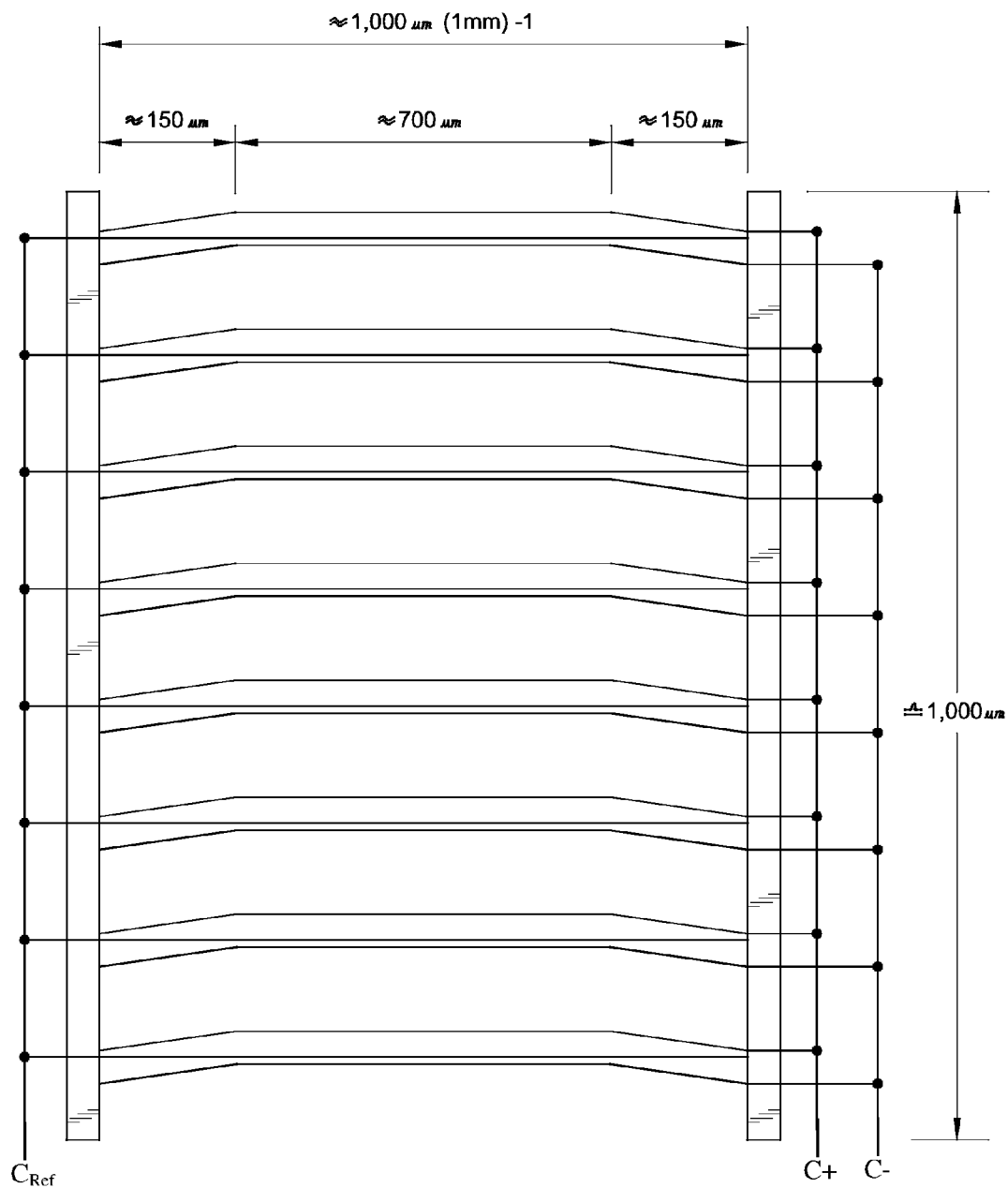
FIG. 9A shows a schematic of a parallel version of the micro-electromechanical capacitive strain sensor according to the present invention.

The three beams 120, 140 and 160 can be regarded as a three-beam unit structure 260. Three-beam unit structures 260 can be coupled together to work in parallel. Capacitance increases in proportion to the number of three-beam unit structures 260 added in parallel. FIGS. 9 and 9A are schematic representations of a configuration comprising 8 sets of three-beam unit structure 260 coupled in parallel; the anchors 180 and 200 are of sufficient length to accommodate the eight units of three-beam unit structure 260. The eight unit parallel structure has an overall length approximately corresponding to its overall width, which in FIG. 9A is around 1000 µm by 1000 µm, i.e., around 1 mm$^2$, which is generally considered to be within the MEMS (micro-electromechanical systems) scale.

Figure 7:
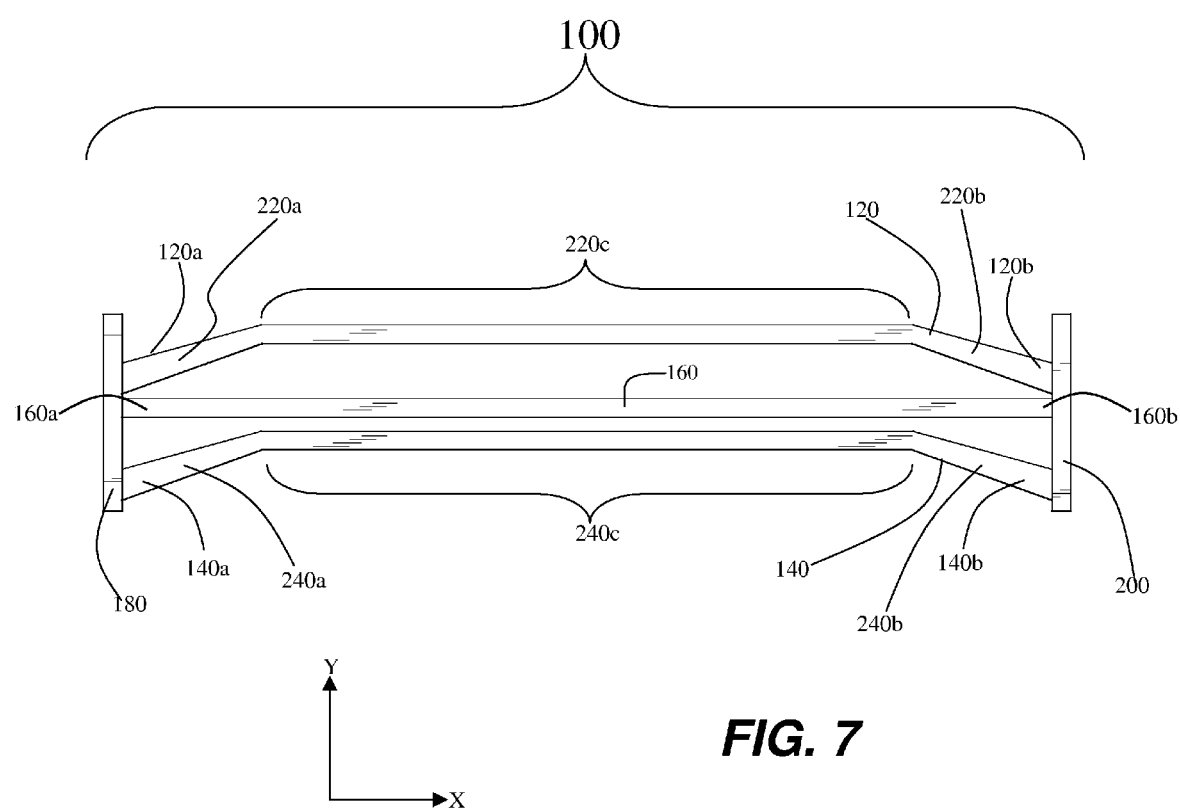
FIG. 7 shows a top planar view of a micro-electromechanical capacitive strain sensor according to the present invention.

The bent beams 120 and 140 can have uniform cross-section area or alternatively have varied cross-section area. For example, FIG. 7 shows bent beams 120 and 140 with ends that taper towards the middle collar segments 220c and 240c, respectively.

The beams 120, 140 and 160 of micro-electromechanical capacitive strain sensor 100 can be fabricated using any suitable fabrication techniques, such as: an etch and undercut process; a deposition, pattern, and etch process; and an etch and release process. One example of an etching process that may be used to fabricate micro-electromechanical capacitive strain sensor 100 of the present invention is disclosed in connection with linear accelerometers in U.S. Pat. No. 6,428,713, entitled "MEMS SENSOR STRUCTURE AND MICRO FABRICATION PROCESS THEREFROM," and U.S. Pat. No. 6,761,070, entitled "MICRO-FABRICATED LINEAR ACCELEROMETER". The entire disclosures of U.S. Pat. Nos. 6,428,713 and 6,761,070 are incorporated herein by reference.

The fabrication steps described in, for example, Chapter 7 in U.S. Provisional Patent Ser. No. 60/893,884 (filed Mar. 8, 2007) are suited for fabricating the beams 120, 140 and 160 of micro-electromechanical capacitive strain sensor 100. The present application claims the benefit of priority to U.S. Provisional Patent Ser. No. 60/893,884.

Non-Limiting Example of Fabricating the Micro-Electromechanical Capacitive Strain Sensor 100 of the Present Invention The following steps show a non-limiting methodology for fabricating the micro-electromechanical capacitive strain sensor 100 of the present invention from 5-inch diameter and 0.09 inch thick quartz (fused silica) substrate. In this example, the micro-electromechanical capacitive strain sensor 100 is made in an inverted position starting with etching of the beams first and then the anchors from an epoxy that acts as an insulating medium, the method comprising:

Step 1: Performing Photolithography
Here, the topside of the wafer is coated with photoresist and the beams are patterned on top as specified in FIG. 12. FIG. 13 shows the wafer after completion of the photolithography step.

Step 2: Performing a Si Dry Etch (DRIE)
Here, the beams are etched using, for example, the Deep Reactive Ion Etch (DRIE)—Bosch process, as specified in FIG. 14. The wafer after the etch process is depicted in FIG. 15.

Step 3: Providing a Photoresist Strip
The photoresist was used to protect the areas that were not to be etched. Now that the etching is complete, the photoresist that was added earlier is stripped off. This part of the process is specified in FIG. 16 and the resulting wafer is depicted in FIG. 17.

Step 4: Performing Photolithography using UV-Curable Epoxy
A UV-curable epoxy is spun-on to a depth of 24 •m on the top surface of the wafer as shown in FIG. 18. Some heating of the wafer may be required for a smoother flow that would result in an even coating of the epoxy. The requirement for selecting the UV-curable epoxy is that its bond strength should be very high. More specifically, its tensile strength (in MPa) should be greater than the maximum strain (3300 microstrain) multiplied by the Young's modulus of the epoxy.
Photolithography is done again as in Step 3 to transfer the anchor pattern onto the wafer and the epoxy is cured at the anchors by the UV-light. Some post-baking may be required as well for better curing.

Step 5: Providing Epoxy Strips
The epoxy is stripped off in the areas where it has not cured from the UV-light exposure using a solvent as given in FIG. 19. The resulting wafer is depicted in FIG. 20.

Step 6: Performing a HF Dip
This step involves dipping the wafer in HF for lifting off the device from the handle wafer. This is achieved by dissolving the one micron intermediate oxide layer as specified in FIG. 21. FIG. 22 shows the wafer after the HF Dip. The detached sensors are gathered using a fine Teflon mesh and are ready to be mounted on the surface of the material to be measured.

Step 7: Connecting to Interface Electronics
Conductive (silver) epoxy can be used later to bond the ends of the beams to the terminations on the interface electronics.

It should be understood that the first and second anchors 180 and 200 can be made out of any suitable material and is not limited to epoxy material. The only important issue is that the anchors 180 and 200 should function as to secure the opposite ends of the beams 120, 140 and 160 without allowing electrical contact between the beams 120, 140 and 160. It should be noted that the exact construction and shape of the anchors 180 and 200 can be constructed in any suitable way to produce any suitable shape of anchor—for example, compare the anchors 180 and 200 in FIGS. 10 and 11.

The method for fabricating the micro-electromechanical capacitive strain sensor 100 of the present invention can be summarized as follows:
fabricating the first bent beam 120, second bent beam 140 and straight center beam 160 from a wafer;

providing first and second anchors such that said first 120, second 140 and center beam 160 are disposed in the X-axis direction between said first and second anchors, wherein said first and second anchors are disposed in the Y-axis direction and said straight center beam 160 is located between said first and second bent beams 120 and 140; and providing conducting links operably coupled to said first, second and center beams 120, 140 and 160, respectively.

Bonding of the Micro-Electromechanical Capacitive Strain Sensor 100

When bonding strain gauges to a surface, it is important that the gauge experience the same strain as the object. Thus when an adhesive material is inserted between the sensor and the strained surface, it is subject to creep due to degradation of the bond, temperature influences, and hysteresis caused by thermoelastic strain. Because many glues and epoxy resins are prone to creep, it is important to use resins designed specifically for strain gages. In particular, it is important that the viscosity levels of the epoxy produce sufficiently fine bead lines when considering MEMS (micro-electromechanical system) devices such as the micro-electromechanical capacitive strain sensor 100 of the present invention.

Of all the adhesives currently available in the market, M-Bond 610 adhesive manufactured by Vishay Measurements Group is the most suitable adhesive for bonding MECASS to steel, aluminum, etc. This epoxy is recommended as the effects of time, humidity conditions, elevated temperature, or moisture absorption do not degrade its performance. It is a two-component, solvent-thinned, epoxyphenolic adhesive for high-performance and high-precision applications. It has low viscosity capable of gluelines less than 5 microns thick. The extremely thin, hard, void free gluelines result in a minimum of creep, hysteresis, and/or linearity problems (Vishay website). It has a long term operating temperature range from −452° F. to +500° F. (−269° C. to +260° C.). It requires cure temperatures of 50° F. to 70° F. (30° C. to 40° C.) above the maximum operating temperature.

It has elongation capability of 1% at −452° F. (−269° C.) to 3% at +500° F. (+260° C.).

In cases where the long term temperature range is within −25° F. to +150° F. (−32° C. to +65° C.) and heat cannot be applied for curing another adhesive called M-Bond 200 (manufactured by Vishay Measurements Group) can also be used. The advantage of this adhesive is that it cures almost instantly at room temperature. The adhesive is also creep-free, fatigue-resistant and has elongation capabilities of more than 5%. It is a special cyanoacrylate, which is certified for use in bonding strain gauges.

It is to be understood that the present invention is not limited to the embodiments described above, but encompasses any and all embodiments within the scope of the following claims.

I claim:

1. A micro-electromechanical capacitive strain sensor, comprising:
    first and second bent beams made of single crystal silicon;
    a straight central beam made of single crystal silicon; and
    first and second anchors, wherein said first and second beams and said straight central beam are disposed between said first and second anchors,
    wherein said straight central beam, first and second bent beams and said anchors form an essentially planar structure, wherein the distance between said first and second anchors is between about 900 μm and 1,500 μm,
    wherein each of said first and second bent beams define first and second opposite end rafter segments and a straight middle collar segment,
    wherein said first bent beam is manufactured to be bent away from said center beam and said second bent beam is manufactured to be bent towards said center beam to provide a set of differential capacitors with respect to said center beam, wherein said center beam serves as a common reference with respect to said first and second bent beams such that when said first and second opposite ends of said first, second and center beams are displaced in opposite directions in the X-axis the first bent beam is deflected in the Y-axis direction towards the center beam thereby increasing capacitance and the second bent beam is deflected in the Y-axis direction away from said center beam thereby decreasing capacitance.

2. The micro-electromechanical capacitive strain sensor of claim 1 further comprising a plurality of three-beam structure units arranged in parallel, wherein each three-beam structure unit comprises first and second bent beams and a straight center beam.

3. A micro-electromechanical capacitive strain sensor, comprising:
    a first bent beam, a second bent beam, and a straight center beam,
        wherein said first, second and center beams are each made of silicon,
        wherein said first, second and center beams each define first and second opposite ends,
        wherein said central horizontal beam is located between said first and second bent beams,
        wherein said first, second and center beams are aligned in the X-axis,
        wherein said first, second and center beams do not touch each other,
        wherein said first bent beam is bent away from said center beam and said second bent beam is bent towards said center beam to provide a set of differential capacitors with respect to said center beam, wherein said center beam serves as a common reference with respect to said first and second bent beams such that when said first and second opposite ends of said first, second and center beams are displaced in opposite directions in the X-axis the first bent beam is deflected in the Y-axis direction towards the center beam and the second bent beam is deflected in the Y-axis direction away from said center beam; and
    a first longitudinal anchor and a second longitudinal anchor, wherein the first and second anchors are positioned in the Y-axis relative to said first and second bent beams, wherein the first anchor is connected to the first opposite ends of the first, second and center beams, and the second anchor is connected to the second opposite ends of the first, second and center beams,
        wherein said first and second anchors are made of insulating material and thereby electrically isolate said first, second and center beams from each other.

* * * * *